(12) United States Patent
Weisman et al.

(10) Patent No.: US 9,802,393 B2
(45) Date of Patent: Oct. 31, 2017

(54) MULTI-LAYER FILMS AND METHODS OF FORMING SAME

(71) Applicant: The Procter & Gamble Company, Cincinnati, OH (US)

(72) Inventors: Paul Thomas Weisman, Cincinnati, OH (US); Eric Patton Weinberger, Fairfield, OH (US); Pier-Lorenzo Caruso, Burgwedel (DE); Michael Remus, Heidelberg (DE)

(73) Assignee: The Procter & Gamble Company, Cincinnati, OH (US)

( * ) Notice: Subject to any disclaimer, the term of this patent is extended or adjusted under 35 U.S.C. 154(b) by 1 day.

(21) Appl. No.: 14/863,480

(22) Filed: Sep. 24, 2015

(65) Prior Publication Data

US 2016/0009059 A1    Jan. 14, 2016

Related U.S. Application Data

(60) Continuation of application No. 13/968,458, filed on Aug. 16, 2013, which is a division of application No. 13/048,630, filed on Apr. 12, 2011, now abandoned.

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/20* (2013.01); *B32B 27/32* (2013.01); *B65D 65/38* (2013.01); *C08J 5/18* (2013.01); *B32B 2250/242* (2013.01); *B32B 2270/00* (2013.01); *B32B 2307/72* (2013.01); *B32B 2439/00* (2013.01);
(Continued)

(58) Field of Classification Search
CPC ....................................................... B23B 27/06
See application file for complete search history.

(56) References Cited

U.S. PATENT DOCUMENTS 4,083,889 A    4/1978 Caesar et al.
4,296,266 A    10/1981 Wunder et al.
(Continued)

FOREIGN PATENT DOCUMENTS

DE    19859789 C1    6/2000
EP    1102569 B1    9/2003
(Continued)

OTHER PUBLICATIONS

International Search Report, PCT/US2012/032955, dated Oct. 31, 2012, 12 pages.

*Primary Examiner* — Ryan Ochylski
(74) *Attorney, Agent, or Firm* — Andrew J. Hagerty; Kelly L. McDow (57) ABSTRACT

A multi-layer film having a first film layer being at least partially formed from a polymer (A) and a polymer (B) and a second film layer being at least partially formed from the polymer (A), the polymer (B), a polymer (C), and optionally an opacifying agent, wherein at least one of the polymer (A), the polymer (B) and the polymer (C) is synthetic and is at least partially derived from a renewable resource such that the multi-layer film has a bio-based content of about 10% to about 100% using ASTM D6866-10, method B. Methods of forming multi-layer films are also provided.

22 Claims, 2 Drawing Sheets

(51) Int. Cl.
*C08J 5/18* (2006.01)
*B32B 27/20* (2006.01)
*B65D 65/38* (2006.01)

(52) U.S. Cl.
CPC ...... *Y10T 156/10* (2015.01); *Y10T 428/24802* (2015.01); *Y10T 428/31913* (2015.04)

(56) References Cited

U.S. PATENT DOCUMENTS

| | | | |
|---|---|---|---|
| 4,423,270 | A | 12/1983 | Pearson |
| 5,475,183 | A | 12/1995 | Araki et al. |
| 6,333,096 | B1 | 12/2001 | Rodgers et al. |
| 6,596,385 | B1 | 7/2003 | Perez |
| 7,588,706 | B2 | 9/2009 | Van Loon et al. |
| 2002/0127382 | A1 | 9/2002 | Susini |
| 2004/0138378 | A1 | 7/2004 | Takagi |
| 2007/0109128 | A1 | 5/2007 | Fujii et al. |
| 2007/0190013 | A1* | 8/2007 | Zhang .................... A61K 9/006 424/70.13 |
| 2007/0252276 | A1 | 11/2007 | Lloyd-George |
| 2008/0299364 | A1* | 12/2008 | Nilsen ................... B32B 27/32 428/213 |
| 2008/0312485 | A1 | 12/2008 | Takai et al. |
| 2009/0017240 | A1* | 1/2009 | Charbonnel ............ B32B 27/08 428/35.2 |
| 2009/0252902 | A1* | 10/2009 | Bender ................... B32B 27/08 428/32.22 |
| 2009/0326293 | A1 | 12/2009 | Gomes et al. |
| 2010/0036173 | A1 | 2/2010 | Manzer et al. |
| 2010/0069589 | A1 | 3/2010 | Bradin |
| 2010/0069691 | A1 | 3/2010 | Morschbacker |
| 2010/0216958 | A1 | 8/2010 | Peters |
| 2010/0260989 | A1 | 10/2010 | Grefenstein et al. |
| 2010/0304062 | A1* | 12/2010 | Daviknes ................ B32B 27/32 428/35.2 |

FOREIGN PATENT DOCUMENTS

| | | | |
|---|---|---|---|
| EP | 1137538 | B1 | 11/2003 |
| EP | 1508439 | A1 | 2/2005 |
| EP | 1488924 | B1 | 4/2006 |
| EP | 1704997 | A1 | 9/2006 |
| EP | 1941999 | B1 | 4/2010 |
| EP | 2121318 | B1 | 6/2010 |
| IN | EP 0942040 | A1 * | 9/1999 ................ C08L 3/02 |
| WO | WO 2004/024433 | A2 | 3/2004 |
| WO | WO 2006/065339 | A1 | 6/2006 |
| WO | WO 2006/073812 | A2 | 7/2006 |
| WO | WO 2007/025727 | A1 | 3/2007 |
| WO | WO 2009/098267 | A1 | 8/2009 |
| WO | WO 2010/063947 | A1 | 6/2010 |

* cited by examiner

FIG. 2

MULTI-LAYER FILMS AND METHODS OF FORMING SAME

CROSS REFERENCE TO RELATED APPLICATION

This application is a continuation of application Ser. No. 13/968,458 filed on Aug. 16, 2013, which is a Divisional of application Ser. No. 13/084,630 filed on Apr. 12, 2011 which is incorporated herein by reference.

FIELD OF THE INVENTION

The present disclosure generally relates to multi-layer films having a bio-based content of about 10% to about 100% using ASTM D6866-10, method B.

BACKGROUND OF THE INVENTION

Many products today require highly engineered components and yet, at the same time, these products are required to be limited use or disposable items. By limited use or disposable, it is meant that the product and/or component is used only a small number of times or possibly only once before being discarded. Examples of such products include, but are not limited to, personal care absorbent articles such as diapers, training pants, incontinence garments, sanitary napkins, bandages, wipes, tissue-towel paper products, and the like, as well as materials used for the packaging of products. These types of products can and do utilize films. When films are used in limited use and/or disposable products, the impetus for maximizing engineered properties while reducing cost is extremely high.

Most of the materials used in current commercial multi-layer films, especially those utilized in packaging applications, are derived from non-renewable resources, such as petroleum. Typically, the components of multi-layer films are made from polyolefins such as polyethylene and polypropylene. These polymers are derived from olefinic monomers such as ethylene and propylene which are obtained directly from petroleum via cracking and refining processes.

The price and availability of the petroleum feedstock ultimately has a significant impact on the price of multi-layer films which utilize materials derived from petroleum. As the worldwide price of petroleum escalates, so does the price of such multi-layer films.

Furthermore, many consumers display an aversion to purchasing products that are derived from petrochemicals. In some instances, consumers are hesitant to purchase products made from limited non-renewable resources such as petroleum and coal. Other consumers may have adverse perceptions about products derived from petrochemicals being "unnatural" or not environmentally friendly.

Accordingly, it would be desirable to provide a multi-layer film which comprises at least one polymer at least partially derived from renewable resources, where the at least one polymer has specific performance characteristics making the polymer particularly useful in the multi-layer film. Accordingly, it would be desirable to provide a multi-layer polymeric film which comprises lower basis weight reducing the use of petroleum and lowering costs, where the multi-layer polymeric film has improved performance characteristics to satisfy product and/or packaging needs

SUMMARY OF THE INVENTION

In accordance with one embodiment, a multi-layer film comprises a first film layer and a second film layer, wherein the multi-layer film has a bio-based content of about 10% to about 100% using ASTM D6866-10, method B. The first film layer has an upper surface and a lower surface. The first film layer is at least partially formed from a polymer (A) and a polymer (B). The first film layer comprises from about 75% to about 99% by weight of the polymer (A) and from about 1% to about 25% by weight of the polymer (B). The polymer (A) comprises at least one of a low density polyethylene (LDPE) and a linear low density polyethylene (LLDPE). The polymer (B) comprises a copolymer. The second film layer at least partially overlies one of the upper surface and the lower surface of the first film layer. The second film layer is at least partially formed from the polymer (A), the polymer (B), a polymer (C), and optionally an opacifying agent. The polymer (C) comprises a homo polypropylene (homo-PP). At least one of the polymer (A), the polymer (B) and the polymer (C) is synthetic and is at least partially derived from a renewable resource.

In accordance with another embodiment, a method of forming a multi-layer film, the method comprises processing a first film layer, wherein the first film layer has an upper surface and a lower surface; processing a second film layer and at least partially overlying the second film layer onto one of the upper surface and the lower surface of the first film layer to form a multi-layer film having a bio-based content of about 10% to about 100% using ASTM D6866-10, method B. The first film layer is at least partially formed from a polymer (A) and a polymer (B). The first film layer comprises from about 75% to about 99% by weight of the polymer (A) and from about 1% to about 25% by weight of the polymer (B). The polymer (A) comprises at least one of a low density polyethylene (LDPE) and a linear low density polyethylene (LLDPE). The polymer (B) comprises a copolymer. The second film layer is at least partially formed from the polymer (A), the polymer (B), a polymer (C), and optionally an opacifying agent. The polymer (C) comprises a homo polypropylene (homo-PP). At least one of the polymer (A), the polymer (B) and the polymer (C) is synthetic and is at least partially derived from a renewable resource.

In accordance with yet another embodiment, a multi-layer film comprises a first film layer, a second film layer, a third film layer and a bio-based content of about 10% to about 100% using ASTM D6866-10, method B. The first film layer has an upper surface and a lower surface. The second film layer at least partially overlies one of the upper surface and the lower surface of the first film layer. The third film layer at least partially overlies the second film layer such that the second film layer forms a core layer. The multi-layer film has a thickness from about 10 microns to about 200 microns, a tensile strength at 10% elongation from about 8 N/mm$^2$ to about 24 N/mm$^2$, and a seal strength from about 0.10 N/mm to about 2.0 N/mm.

In accordance with still another embodiment, a multi-layer film comprises from about 40% to about 90% by weight of the polymer (A), from about 5% to about 50% by weight of a polymer (B), from about 1% to about 20% by weight of a polymer (C), and a bio-based content of about 10% to about 100% using ASTM D6866-10, method B. The polymer (A) comprises at least one of a low density polyethylene (LDPE) and a linear low density polyethylene (LLDPE). The polymer (B) is a copolymer. The polymer (C) comprises a homo polypropylene (homo-PP).

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

I. Definitions

As used herein, the following terms shall have the meaning specified thereafter:

"Absorbent article" means devices that absorb and/or contain liquid. Wearable absorbent articles are absorbent articles placed against or in proximity to the body of the wearer to absorb and contain various exudates discharged from the body. Non-limiting examples of wearable absorbent articles include diapers, pant-like or pull-on diapers, training pants, sanitary napkins, tampons, panty liners, incontinence devices, and the like. Additional absorbent articles include wipes and cleaning products.

"Agricultural product" refers to a renewable resource resulting from the cultivation of land (e.g. a crop) or the husbandry of animals (including fish).

"Bio-based content" refers to the amount of carbon from a renewable resource in a material as a percent of the mass of the total organic carbon in the material, as determined by ASTM D6866-10, method B. Note that any carbon from inorganic sources such as calcium carbonate is not included in determining the bio-based content of the material.

"Communication" refers to a medium or means by which information, teachings, or messages are transmitted.

"Disposed" refers to an element being located in a particular place or position.

"Film" refers to a sheet-like material wherein the length and width of the material far exceed the thickness of the material.

"Monomeric compound" refers to an intermediate compound that may be polymerized to yield a polymer.

"Paper product", as used herein, refers to any formed fibrous structure product, which may, but not necessarily, comprise cellulose fibers. In one embodiment, the paper products of the present disclosure include tissue-towel paper products.

"Petrochemical" refers to an organic compound derived from petroleum, natural gas, or coal.

"Petroleum" refers to crude oil and its components of paraffinic, cycloparaffinic, and aromatic hydrocarbons. Crude oil may be obtained from tar sands, bitumen fields, and oil shale.

"Polymer" refers to a macromolecule comprising repeat units where the macromolecule has a molecular weight of at least 1000 Daltons. The polymer may be a homopolymer, copolymer, terpoymer etc. The polymer may be produced via fee-radical, condensation, anionic, cationic, Ziegler-Natta, metallocene, or ring-opening mechanisms. The polymer may be linear, branched and/or crosslinked.

"Polyethylene" and "polypropylene" refer to polymers prepared from ethylene and propylene, respectively. The polymer may be a homopolymer, or may contain up to about 10 mol % of repeat units from a co-monomer.

"Related environmental message" refers to a message that conveys the benefits or advantages of the multi-layer film comprising a polymer derived from a renewable resource. Such benefits include being more environmentally friendly, having reduced petroleum dependence, being derived from renewable resources, and the like.

"Renewable resource" refers to a natural resource that can be replenished within a 100 year time frame. The resource may be replenished naturally, or via agricultural techniques. Renewable resources include plants, animals, fish, bacteria, fungi, and forestry products. They may be naturally occurring, hybrids, or genetically engineered organisms. Natural resources such as crude oil, coal, and peat which take longer than 100 years to form are not considered to be renewable resources.

"Synthetic polymer" refers to a polymer which is produced from at least one monomer by a chemical process. A synthetic polymer is not produced directly by a living organism.

"Tissue-towel paper product", as used herein, refers to products comprising paper tissue or paper towel technology in general, including, but not limited to, conventional felt-pressed or conventional wet-pressed tissue paper, pattern densified tissue paper, starch substrates, and high bulk, uncompacted tissue paper. Non-limiting examples of tissue-towel paper products include toweling, facial tissue, bath tissue, table napkins, and the like.

II. Polymers Derived from Renewable Resources

A number of renewable resources contain polymers that are suitable for use in multi-layer films (i.e., the polymer is obtained from the renewable resource without intermediates). Suitable extraction and/or purification steps may be necessary, but no intermediate compound is required. Such polymers derived directly from renewable resources include cellulose (e.g. pulp fibers), starch, chitin, polypeptides, poly(lactic acid), polyhydroxyalkanoates, and the like. These polymers may be subsequently chemically modified to improve end use characteristics (e.g., conversion of cellulose to yield carboxycellulose or conversion of chitin to yield chitosan). However, in such cases, the resulting polymer is a structural analog of the starting polymer. Polymers derived directly from renewable resources (i.e., with no intermediate compounds) and their derivatives are known and these materials are not within the scope of the present disclosure.

Synthetic polymers of the present disclosure can be derived from a renewable resource via an indirect route involving one or more intermediate compounds. Suitable intermediate compounds derived from renewable resources include sugars. Suitable sugars include monosaccharides, disaccharides, trisaccharides, and oligosaccharides. Sugars such as sucrose, glucose, fructose, maltose may be readily produced from renewable resources such as sugar cane and sugar beets. Sugars may also be derived (e.g., via enzymatic cleavage) from other agricultural products such as starch or cellulose. For example, glucose may be prepared on a commercial scale by enzymatic hydrolysis of corn starch. While corn is a renewable resource in North America, other common agricultural crops may be used as the base starch for conversion into glucose. Wheat, buckwheat, arracaha, potato, barley, kudzu, cassava, sorghum, sweet potato, yam, arrowroot, sago, and other like starchy fruit, seeds, or tubers are may also be used in the preparation of glucose.

Other suitable intermediate compounds derived from renewable resources include monofunctional alcohols such as methanol or ethanol and polyfunctional alcohols such as glycerol. Ethanol may be derived from many of the same renewable resources as glucose. For example, cornstarch may be enzymatically hydrolyzed to yield glucose and/or other sugars. The resultant sugars can be converted into ethanol by fermentation. As with glucose production, corn is an ideal renewable resource in North America; however, other crops may be substituted. Methanol may be produced from fermentation of biomass. Glycerol is commonly derived via hydrolysis of triglycerides present in natural fats or oils, which may be obtained from renewable resources such as animals or plants.

Other intermediate compounds derived from renewable resources include organic acids (e.g., citric acid, lactic acid, alginic acid, amino acids etc.), aldehydes (e.g., acetaldehyde), and esters (e.g., cetyl palmitate, methyl stearate, methyl oleate, etc.).

Additional intermediate compounds such as methane and carbon monoxide may also be derived from renewable resources by fermentation and/or oxidation processes.

Intermediate compounds derived from renewable resources may be converted into polymers (e.g., glycerol to polyglycerol) or they may be converted into other intermediate compounds in a reaction pathway which ultimately leads to a polymer useful in a multi-layer film. An intermediate compound may be capable of producing more than one secondary intermediate compound. Similarly, a specific intermediate compound may be derived from a number of different precursors, depending upon the reaction pathways utilized.

Particularly desirable intermediates include olefins. Olefins such as ethylene and propylene may also be derived from renewable resources. For example, methanol derived from fermentation of biomass may be converted to ethylene and or propylene, which are both suitable monomeric compounds, as described in U.S. Pat. Nos. 4,296,266 and 4,083,889. Ethanol derived from fermentation of a renewable resource may be converted into the monomeric compound ethylene via dehydration as described in U.S. Pat. No. 4,423,270. Similarly, propanol or isopropanol derived from a renewable resource can be dehydrated to yield the monomeric compound of propylene as exemplified in U.S. Pat. No. 5,475,183. Propanol is a major constituent of fusel oil, a by-product formed from certain amino acids when potatoes or grains are fermented to produce ethanol.

Charcoal derived from biomass can be used to create syngas (i.e., $CO+H_2$) from which hydrocarbons such as ethane and propane can be prepared (Fischer-Tropsch Process). Ethane and propane can be dehydrogenated to yield the monomeric compounds of ethylene and propylene.

Other sources of materials to form polymers derived from renewable resources include post-consumer recycled materials. Sources of synthetic post-consumer recycled materials can include plastic bottles, e.g., soda bottles, plastic films, plastic packaging materials, plastic bags and other similar materials which contain synthetic materials which can be recovered.

III. Exemplary Synthetic Polymers

Olefins derived from renewable resources may be polymerized to yield polyolefins. Ethylene and propylene derived from renewable resources may be polymerized under the appropriate conditions to prepare polyethylene and/or polypropylene having desired characteristics for use in multi-layer films. The polyethylene and/or polypropylene may be high density, medium density, low density, or linear-low density. Further, polypropylene can include homo-PP. Polyethylene and/or polypropylene may be produced via free-radical polymerization techniques, or by using Ziegler-Natta (Zn) catalysis or Metallocene catalysts. Examples of such bio-sourced polyethylenes and polypropylenes are described in U.S. Publication Nos. 2010/0069691, 2010/0069589, 2009/0326293, and 2008/0312485; PCT Application Nos. WO2010063947 and WO2009098267; and European Patent No. 1102569. Other olefins that can be derived from renewable resources include butadiene and isoprene. Examples of such olefins are described in U.S. Publication Nos. 2010/0216958 and 2010/0036173.

Such polyolefins being derived from renewable resources can also be reacted to form various copolymers, including for example random block copolymers, such as ethylene-propylene random block copolymers (e.g., Borpact™ BC918CF manufactured by Borealis). Such copolymers and methods of forming same are contemplated and described for example in European Patent No. 2121318.

In addition, the polyolefin derived from a renewable resource may be processed according to methods known in the art into a form suitable for the end use of the polymer. The polyolefin may comprise mixtures or blends with other polymers such as polyolefins derived from petrochemicals.

It should be recognized that any of the aforementioned synthetic polymers (e.g., copolymers) may be formed by using a combination of monomers derived from renewable resources and monomers derived from non-renewable (e.g., petroleum) resources. For example, the copolymer can comprise propylene repeat units derived from a renewable resource and isobutylene repeat units derived from a petroleum source.

Figure 1:
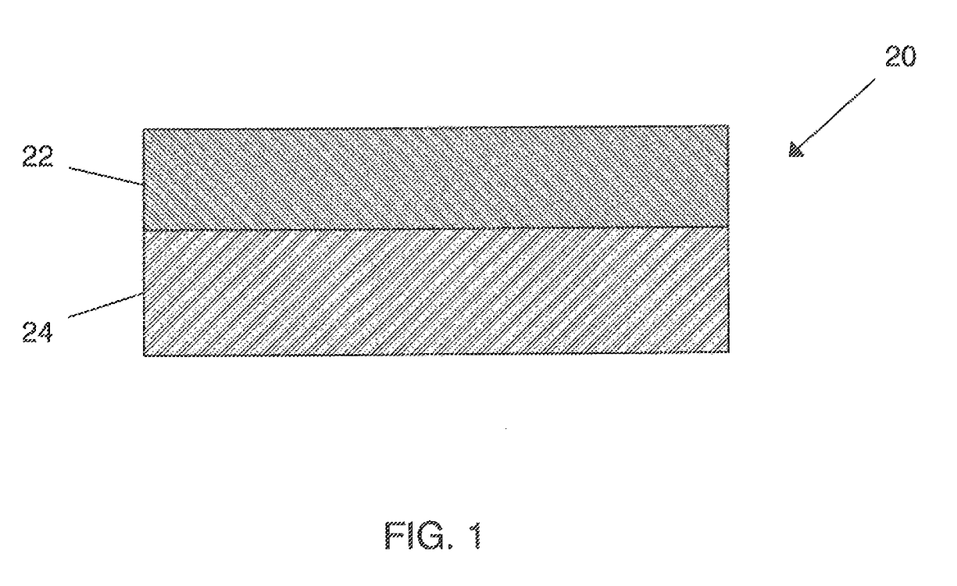
FIG. 1 is a representative view of a multi-layer film having two layers.
Figure 2:
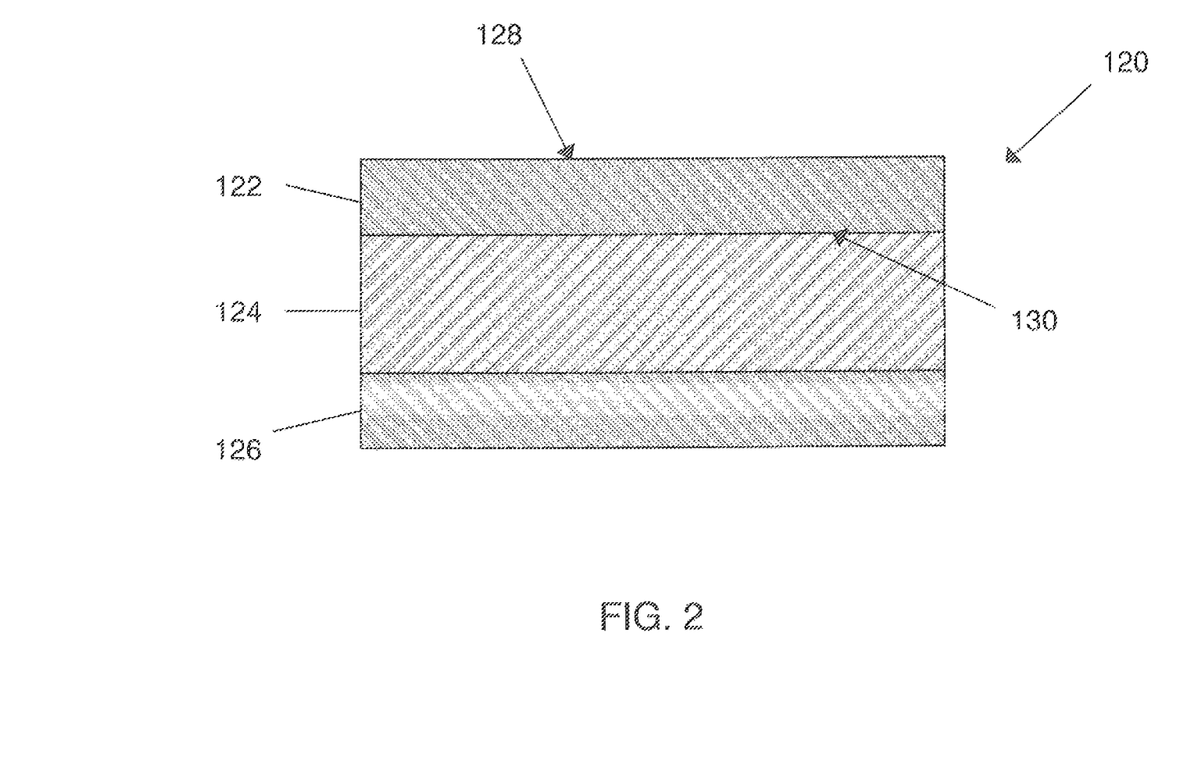
FIG. 2 is a representative view of a multi-layer film having three layers.

IV. Multi-Layer Films Comprising the Synthetic Polymer Derived from Renewable Resources The present disclosure is directed toward multi-layer films. Referring to FIG. 1, the invention comprises a multi-layer film 20 having at least two layers (e.g., a first film layer 22 and a second film layer 24). The first film layer 22 and the second film layer 24 can be layered adjacent to each other to form the multi-layer film (e.g., FIG. 1). As illustrated in FIG. 2, a multi-layer film 120 can have at least three layers (e.g., a first film layer 122, a second film layer 124 and a third film layer 126). As shown in FIG. 2, the second film layer 124 can at least partially overlie at least one of an upper surface 128 or a lower surface 130 of the first film layer 122. The third film layer 126 can at least partially overlie the second film layer 124 such that the second film layer 124 forms a core layer. In addition to the arrangements illustrated in FIGS. 1 and 2, it is contemplated that multi-layer films may include additional layers (e.g., binding layers, non-permeable layers, etc.).

While FIGS. 1 and 2 generally illustrate various layer arrangements for multi-layer films, it will be appreciated that such multi-layer films can comprise from about 2 layers to about 1000 layers; in certain embodiments from about 3 layers to about 200 layers; and in certain embodiments from about 5 layers to about 100 layers.

The multi-layer films contemplated herein can have a thickness (e.g., caliper) from about 10 microns to about 200 microns; in certain embodiments a thickness from about 20 microns to about 100 microns; and in certain embodiments a thickness from about 40 microns to about 60 microns. For example, as illustrated in FIGS. 1 and 2, each of the film layers can have a thickness less than about 100 microns; in certain embodiments less than about 50 microns; and in certain embodiments less than about 10 microns. It will be appreciated that the respective film layers can have substantially the same or different thicknesses. Thickness of the multi-layer films can be evaluated using various techniques, including the methodology set forth in ISO 4593:1993, Plastics—Film and sheeting—Determination of thickness by mechanical scanning In certain embodiments, where a sample of the multi-layer film comprises about a 1.0 inch diameter (having a basis weight from about 10 gsm to about 50 gsm), section 2.1.2 of ISO 4593:1993 will apply, such that a force applied to the sample shall be 0.1 N to 0.5 N. It will be appreciated that out suitable methods may be available to measure the thickness of the multi-layer film described herein.

Each respective layer of the multi-layer film can be formed from a number of the respective synthetic polymers described herein. The selection of polymers used to form the multi-layer film can have an impact on a number of physical parameters, and as such, can provide improved characteristics such as lower basis weights and higher tensile and seal strengths. Examples of commercial multi-layer films with improved characteristics are described in U.S. Pat. No. 7,588,706.

As illustrated by FIG. 1, the first film layer 22 can include a polymer (A) and a polymer (B). In one embodiment, the first film layer 22 can include from about 75% to about 99% by weight of the polymer (A); and in certain embodiments from about 85% to about 95% by weight of the polymer (A). In one embodiment, the first film layer 22 can include from about 1% to about 25% by weight of the polymer (B); and in certain embodiments from about 5% to about 10% by weight of the polymer (B). In one embodiment, the polymer (A) can include a synthetic polymer as described herein, and in particular, a polyethylene, such as LDPE or LLDPE. Examples of such suitable polyethylenes that can be used to form the first film layer are described in U.S. Pat. No. 7,588,706. In one embodiment, the polymer (B) can include a copolymer, such as an ethylene-propylene random block copolymer.

The second film layer 24 can include the polymer (A), the polymer (B) and a polymer (C). In one embodiment, the second film layer 24 can include from about 20% to about 90% by weight of the polymer (A); and in certain embodiments from about 30% to about 85% by weight of the polymer (A). In one embodiment, the second film layer 24 can include from about 35% to about 60% by weight of the polymer (B); and in certain embodiments from about 40% to about 50% by weight of the polymer (B). In one embodiment, the second film layer 24 can include from about 1% to about 35% by weight of the polymer (C); and in certain embodiments from about 3% to about 25% by weight of the polymer (C). In one embodiment, the second film layer 24 can include from about 40% to about 75% by weight of the polymer (A) and an additive material. In certain embodiments, the second film layer 24 can include from about 25% to about 60% by weight of the polymer (B) and polymer (C). Polymer (C) can include polypropylenes (e.g., homo-PP). Such suitable polypropylenes are described in European Patent No. 2121318. In certain embodiments, the second film layer 24 can optionally include an opacifying agent (e.g., titanium dioxide, calcium carbonate) which can provide increased opacity to the multi-layer film. Moreover, each of the polymer (A), polymer (B) and polymer (C) can be synthetic and at least partially derived from a renewable resource. In certain embodiments, where the polymer (B) is present in both the first film layer and the second film layer provided additional advantages. Such advantages include better interfacial interaction between the respective layers, thus providing better adhesion between the film layers, particularly when the polymer (B) is an ethylene-propylene random block copolymer.

As illustrated in FIG. 2, a multi-layer film can include a 3-layer arrangement wherein a first film layer 122 and a third film layer 126 form the skin layers and a second film layer 124 is formed between the first film layer 122 and the third film layer 126 to form a core layer. The first film layer 122 and the second film layer 124 of FIG. 2 can be similarly formed as the first film layer 22 and the second film layer 24 of FIG. 1. The third film layer 126 can be the same or different from the first film layer 122, such that in certain embodiments, the third film layer 126 can include the polymer (A) and polymer (B) as described herein. It will be appreciated that similar film layers could be used to form multi-layer films having more than 3 layers. Furthermore, in certain embodiments, the S-layer arrangement as illustrated in FIG. 2 can provide a multi-layer film having from about 40% to about 90% by weight of the polymer (A), from about 5% to about 50% by weight of the polymer (B) and from about 1% to about 20% by weight of the polymer (C).

In addition to being formed from the synthetic polymers described herein, the layers of the multi-layer film can further include additional additives. For example, opacifying agents can be added to one or more of the film layers. Such opacifying agents can include iron oxides, carbon black, aluminum, aluminum oxide, titanium dioxide, talc and combinations thereof. These opacifying agents can comprise about 0.1% to about 5% by weight of the multi-layer film; and in certain embodiments, the opacifying agents can comprise about 0.3% to about 3% of the multi-layer polymeric film. It will be appreciated that other suitable opacifying agents may be employed and in various concentrations. Examples of opacifying agents are described in U.S. Pat. No. 6,653,523.

Furthermore, the multi-layer films may comprise other additives, such as other polymers (e.g., a polypropylene, a polyethylene, a ethylene vinyl acetate, a polymethylpentene any combination thereof, or the like), a filler (e.g., glass, talc, calcium carbonate, or the like), a mold release agent, a flame retardant, an electrically conductive agent, an anti-static agent, a pigment, an antioxidant, an impact modifier, a stabilizer (e.g., a UV absorber), wetting agents, dyes, or any combination thereof.

The multi-layer films described herein can have enhanced properties, such as higher tensile and seal strengths. In certain embodiments, the tensile strength of the multi-layer film measured at 10% elongation can be from about 8 $N/mm^2$ to about 24 $N/mm^2$; and in certain embodiments from about 10 $N/mm^2$ to about 15 $N/mm^2$. In certain embodiments, the tensile strength of the multi-layer film measured at break can be from about 20 $N/mm^2$ to about 60 $N/mm^2$; and in certain embodiments from about 25 $N/mm^2$ to about 40 $N/mm^2$. Such tensile strength measurements are provided in normalized states (e.g., tensile strength was divided by the caliper of the film (e.g., 50 microns)). However, it will be appreciated that tensile strength could also be measured in units N/mm.

As noted herein, tensile strength can be measure in a variety of ways, including an evaluation of the tensile strength at either 10% elongation or at break. One standard to apply in measuring tensile strength is the methodology set forth in ISO 527-5:2009, Plastics—Determination of tensile properties. In order to apply the methodology of ISO 527-5:2009, a sample of the multi-layer film will need to be prepared. In one embodiment, a sample size of 25.4 mm (or 1 inch) can be prepared. The sample can then be placed under pressure by a clamping mechanism, such that a grip distance of about 50 mm is established. Next, the sample is subject to a testing speed of about 500 mm/min such that sufficient force is placed on the sample to stretch it accordingly. Using various modeling techniques (e.g., Zwick) and measuring the displacement of the sample under pressure, a model can be developed calculating the tensile strength associated with the sample of the multi-layer film. The results of the modeling can then be evaluated pursuant to the parameters set forth in the ISO 527-5:2009 permitting calculation of the tensile strength at both 10% elongation and at break. It will be appreciated that other suitable techniques may be available by which to measure tensile strength of a multi-layer film.

In certain embodiments, the multi-layer films can have a seal strength from about 0.10 N/m to about 2.0 N/m; and in certain embodiments from about 0.20 N/m to about 1.0 N/m. The seal strength can be measured using a variety of techniques, including the methodology set forth in ISO 527-5:2009. To apply the methodology of ISO 527-5:2009, a sample of the multi-layer film will need to be prepared. In one embodiment, a sample size of 25.4 mm (or 1 inch) can be used, wherein the sample includes a seal extending along the mid-region of the sample. The "seal" can include any region where one edge of the multi-layer film has been joined with another edge of the same (or different) multi-layer film. It will be appreciated that this seal can be formed using a variety of suitable techniques (e.g., heat sealing). The sample can then be placed under pressure by a clamping mechanism, such that a grip distance of about 50 mm is established and the seal is placed between the grip distance. Next, the sample is subject to a testing speed pursuant to ISO 527-5:2009 such that sufficient force is placed on the sample to stretch it accordingly. Using various modeling techniques, the seal strength associated with the sample of the multi-layer film can be measured. The results of the modeling can then be evaluated pursuant to the parameters set forth in the ISO 527-5:2009. It will be appreciated that other suitable techniques may be available by which to measure seal strength of a multi-layer film.

V. Method of Making a Multi-Layer Film Having a Polymer Derived from a Renewable Resource The present disclosure further relates to a method for making a multi-layer film comprising a synthetic polymer derived from a renewable resource. The method comprises the steps of providing a renewable resource; deriving an intermediate monomer from the renewable resource; polymerizing the intermediate monomer to form a synthetic polymer and incorporating the synthetic polymer into a multi-layer film. The present disclosure further relates to providing one or more of the multi-layer films to a consumer and communicating reduced petrochemical usage to the consumer. The synthetic polymer derived from renewable resources may undergo additional process steps prior to incorporation into the multi-layer film.

The present disclosure further relates to a method for making the layered arrangement for a multi-layer film. Multi-layer films can be made by known layering processes typically using a uni-axial cast or planar sheet process or lamination. Coextruded cast film or sheet structures typically have 2 to 5 layers; however, cast film or sheet structures including hundreds of layers are known. For example, early multi-layer processes and structures are shown in U.S. Pat. Nos. 3,565,985; 3,557,265; and 3,884,606. WO 2008/008875 discloses a related art method of forming multi-layered structures having many, for example fifty to several hundred, alternating layers of film.

Other manufacturing options include simple blown film processes, as described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller). The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 1-80 (published by TAPPI Press (1992).

The multi-layer films can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229, the disclosure of which is incorporated herein by reference. If a monolayer film layer is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), then the film must go through an additional post-extrusion step of adhesive or extrusion lamination to other packaging material layers to form a multi-layer film. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), also discusses lamination versus coextrusion. The multi-layer films contemplated herein can also go through other post extrusion techniques, such as a biaxial orientation process.

VI. Validation of Polymers Derived from Renewable Resources

A suitable validation technique is through $^{14}C$ analysis. A small amount of the carbon dioxide in the atmosphere is radioactive. This $^{14}C$ carbon dioxide is created when nitrogen is struck by an ultra-violet light produced neutron, causing the nitrogen to lose a proton and form carbon of molecular weight 14 which is immediately oxidized to carbon dioxide. This radioactive isotope represents a small but measurable fraction of atmospheric carbon. Atmospheric carbon dioxide is cycled by green plants to make organic molecules during photosynthesis. The cycle is completed when the green plants or other forms of life metabolize the organic molecules, thereby producing carbon dioxide which is released back to the atmosphere. Virtually all forms of life on Earth depend on this green plant production of organic molecules to grow and reproduce. Therefore, the $^{14}C$ that exists in the atmosphere becomes part of all life forms, and their biological products. In contrast, fossil fuel based carbon does not have the signature radiocarbon ratio of atmospheric carbon dioxide.

Assessment of the renewably based carbon in a material can be performed through standard test methods. Using radiocarbon and isotope ratio mass spectrometry analysis, the bio-based content of materials can be determined. ASTM International, formally known as the American Society for Testing and Materials, has established a standard method for assessing the bio-based content of materials. The ASTM method is designated ASTM D6866-10.

The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

The modern reference standard used in radiocarbon dating is a NIST (National Institute of Standards and Technology) standard with a known radiocarbon content equivalent approximately to the year AD 1950. AD 1950 was chosen since it represented a time prior to thermo-nuclear weapons testing which introduced large amounts of excess radiocarbon into the atmosphere with each explosion (termed "bomb carbon"). The AD 1950 reference represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. It's gradually decreased over time with today's value being near 107.5 pMC. This means that a fresh biomass material such as corn could give a radiocarbon signature near 107.5 pMC.

Combining fossil carbon with present day carbon into a material will result in a dilution of the present day pMC content. By presuming 107.5 pMC represents present day biomass materials and 0 pMC represents petroleum derivatives, the measured pMC value for that material will reflect the proportions of the two component types. A material derived 100% from present day soybeans would give a radiocarbon signature near 107.5 pMC. If that material was diluted with 50% petroleum derivatives, for example, it would give a radiocarbon signature near 54 pMC (assuming the petroleum derivatives have the same percentage of carbon as the soybeans).

A biomass content result is derived by assigning 100% equal to 107.5 pMC and 0% equal to 0 pMC. In this regard, a sample measuring 99 pMC will give an equivalent bio-based content value of 92%.

Assessment of the materials described herein was done in accordance with ASTM D6866. The mean values quoted in this report encompasses an absolute range of 6% (plus and minus 3% on either side of the bio-based content value) to account for variations in end-component radiocarbon signatures. It is presumed that all materials are present day or fossil in origin and that the desired result is the amount of bio-based component "present" in the material, not the amount of bio-based material "used" in the manufacturing process.

In one embodiment, a multi-layer film comprises a bio-based content value from about 10% to about 100% using ASTM D6866-10, method B. In another embodiment, a multi-layer film comprises a bio-based content value from about 20% to about 100% using ASTM D6866-10, method B. In yet another embodiment, a multi-layer film comprises a bio-based content value from about 50% to about 100% using ASTM D6866-10, method B.

In order to apply the methodology of ASTM D6866-10 to determine the bio-based content of a multi-layer film, a representative sample of the component must be obtained for testing. In one embodiment, a representative portion of the multi-layer film can be ground into particulates less than about 20 mesh using known grinding methods (e.g., Wiley® mill), and a representative sample of suitable mass taken from the randomly mixed particles.

VII. Communicating a Related Environmental Message a Consumer

The present disclosure relating to multi-layer films derived from renewable resources, further provides means for which to communicate an environmental message to a consumer. Such messages could be displayed on the multi-layer films, in such circumstances where the films are used as packaging materials for absorbent articles (e.g., diapers). The related environmental message may convey the benefits or advantages of the multi-layer film comprising a polymer derived from a renewable resource. The related environmental message may identify the multi-layer film as: being environmentally friendly or Earth friendly; having reduced petroleum (or oil) dependence or content; having reduced foreign petroleum (or oil) dependence or content; having reduced petrochemicals or having components that are petrochemical free; and/or being made from renewable resources or having components made from renewable resources. This communication is of importance to consumers that may have an aversion to petrochemical use (e.g., consumers concerned about depletion of natural resources or consumers who find petrochemical based products unnatural or not environmentally friendly) and to consumers that are environmentally conscious. Without such a communication, the benefit of the present disclosure may be lost on some consumers.

The communication may be effected in a variety of communication forms. Suitable communication forms include store displays, posters, billboard, computer programs, brochures, package literature, shelf information, videos, advertisements, internet web sites, pictograms, iconography, or any other suitable form of communication. The information could be available at stores, on television, in a computer-accessible form, in advertisements, or any other appropriate venue. Ideally, multiple communication forms may be employed to disseminate the related environmental message.

The communication may be written, spoken, or delivered by way of one or more pictures, graphics, or icons. For example, a television or internet based-advertisement may have narration, a voice-over, or other audible conveyance of the related environmental message. Likewise, the related environmental message may be conveyed in a written form using any of the suitable communication forms listed above. In certain embodiments, it may be desirable to quantify the reduction of petrochemical usage of the present multi-layer films compared to multi-layer films that are presently commercially available.

The related environmental message may also include a message of petrochemical equivalence. Many renewable, naturally occurring, or non-petroleum derived polymers are known. However, these polymers often lack the performance characteristics that consumers have come to expect when used in conjunction with multi-layer films. Therefore, a message of petroleum equivalence may be necessary to educate consumers that the polymers derived from renewable resources, as described above, exhibit equivalent or better performance characteristics as compared to petroleum derived polymers. A suitable petrochemical equivalence message can include comparison to multi-layer films that do not have a polymer derived from a renewable resource. For example, a suitable combined message may be, "Packaging for Product Brand A with an environmentally friendly material is just as effective as Packaging for Product Brand B." This message conveys both the related environmental message and the message of petrochemical equivalence.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-layer film comprising:
   a) a first film layer having an upper surface and a lower surface, the first film layer being at least partially formed from a polymer (A) and a polymer (B), wherein the first film layer comprises from about 75% to about 99% by weight of the polymer (A) and from about 1% to about 25% by weight of the polymer (B), wherein the polymer (A) comprises at least one of a low density polyethylene (LDPE) and a linear low density polyethylene (LLDPE) and the polymer (B) comprises a copolymer;
   b) a second film layer at least partially overlying one of the upper surface and the lower surface of the first film layer, the second film layer being at least partially formed from the polymer (A), the polymer (B), a polymer (C), and optionally an opacifying agent, wherein the polymer (C) comprises a homo polypropylene (homo-PP), and wherein at least one of the polymer (A), the polymer (B) and the polymer (C) comprises a polyolefin whose precursor monomers were at least partially derived from a renewable resource selected from the group consisting of plants, animals, fish, bacteria, fungi, and forestry products; and
   c) a bio-based content of about 10% to about 100%, wherein the bio-based content is the percent mass of organic carbon in the multi-layer film at the exclusion of carbon from inorganic sources using ASTM D6866-10, method B.

2. The multi-layer film of claim 1 further comprising a third film layer, the third film layer at least partially overlying the second film layer such that the second film layer forms a core layer, the third film layer comprises from about 75% to about 99% by weight of the polymer (A) and from about 1% to about 25% by weight of the polymer (B).

3. The multi-layer film of claim 2, wherein at least one of the first film layer and the third film layer comprises an indicia to communicate an environmental message to a consumer.

4. The multi-layer film of claim 2 having the bio-based content of about 20% to about 100%, wherein the bio-based content is the percent mass of organic carbon in the multi-layer film at the exclusion of carbon from inorganic sources using ASTM D6866-10, method B.

5. The multi-layer film of claim 4 having the bio-based content of about 50% to about 100%, wherein the bio-based content is the percent mass of organic carbon in the multi-layer film at the exclusion of carbon from inorganic sources using ASTM D6866-10, method B.

6. The multi-layer film of claim 1, wherein the second film layer comprises from about 20% to about 90% by weight of the polymer (A).

7. The multi-layer film of claim 1, wherein the second film layer comprises from about 35% to about 60% by weight of the polymer (B).

8. The multi-layer film of claim 1, wherein the second film layer comprises from about 1% to about 35% by weight of the polymer (C).

9. The multi-layer film of claim 1 further comprising from about 0.1% to about 5.0% by weight of additives.

10. The multi-layer film of claim 1 further comprising the opacifying agent, wherein the opacifying agent comprises one or more of titanium dioxide, calcium carbonate, or combinations thereof.

11. The multi-layer film of claim 1, wherein the first film layer comprises from about 85% to about 95% by weight of the polymer (A) and from about 5% to about 10% by weight of the polymer (B).

12. The multi-layer film of claim 1, wherein the copolymer is an ethylene-propylene random block copolymer.

13. The multi-layer film of claim 1 having a tensile strength at 10% elongation from about 8 N/mm$^2$ to about 24 N/mm$^2$.

14. The multi-layer film of claim 13 having a tensile strength at 10% elongation from about 10 N/mm$^2$ to about 15 N/mm$^2$.

15. The multi-layer film of claim 1 having a tensile strength at break from about 20 N/mm$^2$ to about 60 N/mm$^2$.

16. The multi-layer film of claim 15 having a tensile strength at break from about 25 N/mm$^2$ to about 40 N/mm$^2$.

17. The multi-layer film of claim 1 having a thickness from about 10 microns to about 200 microns.

18. The multi-layer film of claim 17 having a thickness from about 20 microns to about 100 microns.

19. The multi-layer film of claim 1 having a seal strength from about 0.10 N/mm to about 2.0 N/mm.

20. The multi-layer film of claim 19 having a seal strength from about 0.20 N/mm to about 1.0 N/mm.

21. An absorbent article package comprising the multi-layer film of claim 1.

22. The multi-layer film of claim 1, wherein the renewable resource is a genetically engineered resource.

* * * * *